Patented Aug. 26, 1952

UNITED STATES PATENT OFFICE 2,608,560

METHOD FOR ISOLATION AND PURIFICATION OF ACTIVE PLANT PRINCIPLES

Thomas Carl Aschner, Philadelphia, Pa., and John Verga Meyer, Haddon Heights, N. J., assignors to Smith, Kline & French Laboratories, Philadelphia, Pa., a corporation of Pennsylvania No Drawing. Application May 21, 1951, Serial No. 227,512

11 Claims. (Cl. 260—333)

This invention relates to an improved method for the extraction of the active plant principles of *Ammi visnaga*, by means of which those principles may be isolated and purified more efficiently and in higher yields.

The active principles of the *Ammi visnaga* plant, khellin and visnagin, are known and reported extensively in the literature to possess various beneficial physiological activities, particularly as bronchodilator and coronary dilator agents, rendering them of high potential therapeutic value.

The active principles occur primarily in the seeds of the plant, and have been isolated by extraction in the past in a fairly impure state by cumbersome and inefficient methods, and the resultant crude extract was purified by procedure involving repeated recrystallization, chromatography, and similar difficult methods. The crude khellin extract so prepared is usually contaminated to a high degree with various other materials occurring in the plant seed including visnagin itself. Such methods in the past have uniformly utilized as extractants common organic solvents such as, e. g., alcohol, benzene and chloroform which, because such solvents simultaneously extract to a high degree other contaminants occurring in the seed, has served only to render the subsequent separation of pure khellin more difficult.

An object of this invention is to provide an improved process for the isolation and purification of khellin and visnagin, the active principles of the *Ammi visnaga* plant.

An additional object of this invention is to provide a process for the extraction of the active principles of the *Ammi visnaga* plant, using water as an extractant.

Broadly, the process of this invention involves extracting, either batchwise or in a continuous fashion, *Ammi visnaga*, seeds with water to thoroughly leach out the crude khellides, mixing the aqueous extract with a low-boiling organic solvent in which the active principles are preferentially soluble, and separation of the organic and aqueous phases resulting therefrom. The crude khellides taken into the organic layer may then be isolated by various procedures. Complete evaporation, for example, will yield a high-melting, wax-like residue of comparatively high active khellide concentration, which may then be separated into its component ingredients—khellin, visnagin, and a small percentage of unidentified, highly-colored contaminants—by recrystallization.

Alternatively, it has been found preferable to incompletely evaporate the solvent of the organic phase and, upon cooling, allow a material of much purer khellide concentration, containing practically no contaminants other than visnagin itself, to crystallize from the residual mixture, from which analytically pure khellin may be readily isolated in theoretical amounts by only one recrystallization.

The fact that water was not heretofore used as an extractant is understandable in view of the relatively high insolubility of khellin in that medium, particularly compared to its solubilities in various common organic solvents. By using water to extract the seeds in the process of this invention, one isolates khellin in high concentrations and in virtual absence of other naturally-occurring contaminant materials, from which crude mixture can be isolated pure khellin and visnagin with great ease, efficiency and economy.

By using the method of this invention, crude mixtures of khellin and visnagin of wide ranges of composition may be obtained. It is quite possible to accumulate in the crude product the entire khellin and visnagin content occurring in the original seed. Depending upon the organic solvent utilized, it may then be necessary to defat the crude mixture by removing the non-khellide material through the use of a solvent such as petroleum ether. Alternatively, by the use of such organic solvents as benzene or carbon tetrachloride for extraction of the aqueous phase, followed by crystallization of the incompletely evaporated still concentrate, there is yielded a crude product consisting almost entirely of khellin and visnagin, of which the khellin concentration may be greater than 85%.

It has been found that the temperature of the water used to extract the *Ammi visnaga* seeds in the process of this invention, has very little effect upon the efficiency of the extraction process within the range of from room temperature to boiling. Since lower-boiling organic solvents, however, are preferably used to extract the resulting aqueous phase, it is advantageous to operate the aqueous extraction at or near room temperature. Similarly, it has been found neither necessary nor advantageous to grind the dry *Ammi visnaga seeds*, there being thereby obtained no greater yields of khellin, because the problem of seed bed erosion becomes a major one, under such conditions.

The choice of an organic solvent with which to extract the water phase of the process of this invention is not considered critical. Indeed, a wide range of water-immiscible, organic solvents for whellin of appropriate boiling point can be used. Among these, such solvents as benzene, carbon tetrachloride, trichlorethylene, and chloroform have all been found particularly convenient. A further consideration in the choice of such a solvent, in addition to possible toxicity and economy, is the ability of the particular solvent to be agitated together with the aqueous phase without undue formation of emulsions, making subsequent separation of the two phases difficult.

Isolation of analytically pure khellin from crude khellin-visnagin mixtures contaminated with other plant materials has been readily effected by recrystallization from solutions of aliphatic alcohols of from 4 to 8 carbon atoms. Particularly preferable for this purpose, it has been found, is n-butylcarbinol. By this method a 70% yield of pure khellin was obtained after two recrystallizations with n-butylcarbinol from an impure, crude khellin of approximately 50% khellin, 20% visnagin and 30% other unidentified, highly-colored impurities. Material resulting from a first crystallization with the solvent at 110° C. contained 90% khellin and 10% visnagin. That resulting from the second crystallization, after drying, was determined by infrared, chemical, and solubility analysis to contain 100% pure khellin of a melting point of 152–153° C., with no detectable amounts of visnagin, according to present analytical methods. It has been found advantageous to wash the product of the second crystallization with a lower-boiling solvent, such as petroleum ether, to facilitate removal of solvent and drying of the crystals.

In another instance in which the crystalline product of incomplete evaporation of the organic phase was utilized, the crude khellin contained 85 to 90% pure khellin initially. In this instance a single crystallization from n-butylcarbinol was sufficient to afford pure khellin in a practically theoretical yield. It is of interest to note that purification of khellin itself is most readily accomplished from crude mixtures containing at least 80% khellin, which percentage appears to be critical in that at this concentration or greater, advantage may be taken of the differences in solubility between visnagin and khellin to isolate pure khellin with a single crystallization. The remaining material consists almost entirely of visnagin. Utilization of amyl alcohol for recrystallization of crude khellin mixtures of less than 80% khellin, and particularly those containing other impurities than visnagin, allows one to approach the theoretical yield of pure khellin only with greater difficulty by successive recrystallizations.

Of additional interest is the fact that analytically pure visnagin is readily obtained from the mother-liquors from the above recrystallizations with n-butylcarbinol. This may be effected by merely agitating the liquors with an equivalent amount of water and cooling overnight. Solids found to deposit in the aqueous phase were determined, upon centrifuging and drying, to be spectroscopically pure crystals of visnagin.

As an additional feature of the process of this invention, it has been found decidedly advantageous to recycle the aqueous phase, once depleted of khellides and after separation of the two phases, back through the seed bed rather than to utilize fresh supplies of water for this purpose. In this manner, aqueous concentrations of khellin far in excess of its solubility in pure water, which is only 0.3 mg. per cc. at room temperature, can be obtained. Aqueous concentrations of khellin, determined by vacuum distillation to contain as much as 10 mg. of khellin per cc., have been so prepared. In other words, by recycling the residual aqueous phase from this process, a 30-fold concentration of khellin over the theoretical maximum can be obtained.

This solubilizing effect is best explained by postulating the presence of an unidentified solubilizing principle which is natively present in the *Ammi visnaga* seed, and being water soluble, must also be extracted along with the khellide material. It is evident that this principle is comparatively insoluble in non-polar solvents and is retained in the aqueous phase upon separation from the organic solvent. Recycling of this aqueous phase takes advantage of the solubilizing principle to effect increasingly efficient extraction of the *Ammi visnaga* seeds. Further, it is believed that this hypothesis may serve to explain the fact that seeds of significant khellin concentration are found only in arid climates.

It has been found that the contact time of the aqueous phase and the seeds in each cycle can be very short, a fact explainable by the presence of a solubilizing principle. By carrying out a small extraction of the seed, batchwise, and permitting it to mix with the seeds for determined lengths of time, it was found that 5 minutes contact time sufficed to effect optimal extraction of khellides from the seeds.

As more particularly illustrative of the process of this invention is the following example, details of which, it will be appreciated, may be varied within reasonable limits without materially affecting the nature of the results.

*Example*

1,000 g. of dry *Ammi visnaga* seeds were placed in a cylindrical, two-liter container fitted at the top and bottom with suitable-mesh screens to prevent erosion of the seed bed. The container was further fitted with liquid inlet and outlet at the bottom and top, respectively, so that the extracting liquid percolated upward through the seed bed. Sufficient water was added to fill the interstices between the seeds and to just cover with a thin layer of water the top of the seed bed, which was then permitted to swell for approximately 30 minutes.

Ordinary tap water, at room temperature, was introduced by pump, or the pressure of a liquid head, into the seed container from the bottom and permitted to percolate through the seeds and to overflow through the top at a rate of 4,000 cc. per hour.

From the top outlet of the seed container the effluent aqueous phase was directed into a small vessel of about 300 to 500 cc., provided with an efficient agitator and a bottom drain. Through another inlet in the same vessel, carbon tetrachloride or other suitable organic solvent was introduced into the mixing vessel at approximately the same rate as the aqueous phase. It was thoroughly mixed with the aqueous phase and the mixed liquids were drawn off from the bottom of this mixing vessel in a continuous fashion at approximately the combined rates of liquid influent entering the vessel.

The mixed liquids, upon leaving the mixing vessel, were separated into an aqueous and an organic phase in a continuous fashion, by the use, for example, of a decantation column or solid cone centrifuge. The aqueous phase was then returned for recycling, countergravity, through the seed container as described above. The organic phase was continuously channelled into a solvent-still and the distilled, purified solvent was continuously recycled into the mixing vessel for further extraction of the aqueous phase as described above.

After approximately four hours (a total through-put of about 16,000 cc. of recycled water through the seeds) the seeds were practically exhaused of khellides. The process was then stopped, but all organic solvent in circulation was distilled through the still, permitting high-boiling residues to build up in the still. These high-boiling residues, representing concentrated khellide material, were then exhaustively evaporated of solvent to isolate crude, solid khellide material. Alternatively, by incomplete evaporation of the inorganic solvent a purer mixture of active khellide principles may be crystallized out.

By the above procedure, practically all khellin detectable by analytical methods in the original seeds can be removed and obtained as crude khellin. In a typical experiment, for example, on seeds the khellin content of which was determined to be 1%, 20 g. of crude khellin was obtained from 1,000 g. of the dry *Ammi visnaga* seeds. The crude khellin was obtained by complete evaporation of the organic solvent from the high-boiling residues and was determined to have a khellin content of 50% and a visnagin content of 25%, the balance consisting of unidentified plant materials.

As a further example, using the procedure of the example, the organic solvent was incompletely evaporated from the high-boiling residue in the solvent-still, and there was obtained by crystallization of the residual material 11.5 g. of light yellow crystals, consisting of 10 g. of khellin, 1.2 g. of visnagin and 0.3 g. of unidentified plant contaminants. In both cases the yield of crude khellin, calculated as pure khellin, was 1%, based upon the weight of the dry seeds, or a theoretical yield.

The scope of the present invention is to be limited only in accordance with the appended claims.

What is claimed is:

1. A process for the isolation of active plant principles of the *Ammi visnaga* plant comprising extracting *Ammi visnaga* seeds with water.

2. A process for the isolation and purification of active plant principles of the *Ammi visnaga* plant comprising extracting *Ammi visnaga* seeds with water, extracting the resulting aqueous phase with a water-immiscible solvent in which the active principles are preferentially soluble, separating the aqueous and solvent phases, and separating the solvent from the active principles.

3. A process for the isolation and purification of active plant principles of the *Ammi visnaga* plant comprising extracting *Ammi visnaga* seeds with water, extracting the resulting aqueous phase with a water-immiscible solvent in which the active principles are preferentially soluble, separating the aqueous and solvent phases, separating the solvent from the active principles, and recycling the aqueous phase to the seed extraction step.

4. A process for the isolation and purification of active plant principles of the *Ammi visnaga* plant comprising extracting *Ammi visnaga* seeds with water, extracting the resulting aqueous phase with a water-immiscible preferential solvent for the active principles, separating the aqueous and solvent phases, separating the solvent from the active principles, and separating the active principles from each other by recrystallization of one principle from solution in an aliphatic alcohol having four to eight carbon atoms.

5. A process for the isolation and purification of active plant principles of the *Ammi visnaga* plant comprising extracting *Ammi visnaga* seeds with water, extracting the resulting aqueous phase with a water-immiscible preferential solvent for the active principles, separating the aqueous and solvent phases, separating the solvent from the active principles, and separating the active principles from each other by recrystallization of one principle from solution in n-butylcarbinol.

6. A process for the isolation and purification of khellin and visnagin from the seeds of the *Ammi visnaga* plant comprising extracting *Ammi visnaga* seeds with water, extracting the resulting aqueous phase with a water-immiscible preferential solvent for khellin and visnagin, separating the aqueous and solvent phases, separating the solvent from the khellin and visnagin, dissolving the khellin and visnagin mixture in an aliphatic alcohol having four to eight carbon atoms, recrystallizing khellin from solution in said alcohol, mixing the mother liquor from the recrystallization step with water, cooling the mixture, and separating crystals of visnagin from the aqueous phase.

7. A process for the isolation and purification of khellin and visnagin from the seeds of the *Ammi visnaga* plant comprising extracting *Ammi visnaga* seeds with water, extracting the resulting aqueous phase with a water-immiscible preferential solvent for khellin and visnagin, separating the aqueous and solvent phases, separating the solvent from the khellin and visnagin, dissolving the khellin and visnagin mixture in n-butylcarbinol, recrystallizing khellin from solution in said alcohol, mixing the mother liquor from the recrystallization step with water, cooling the mixture, and separating crystals of visnagin from the aqueous phase.

8. A process for the recovery of purified khellin and visnagin from an impure mixture thereof which comprises dissolving the impure mixture in an aliphatic alcohol having four to eight carbon atoms and removing purified khellin from solution by crystallization.

9. A process for the recovery of purified khellin and visnagin from an impure mixture thereof which comprises dissolving the impure mixture in n-butylcarbinol and removing purified khellin from solution by crystallization.

10. A process for the recovery of purified khellin and visnagin from an impure mixture thereof which comprises dissolving the impure mixture in an aliphatic alcohol having four to eight carbon atoms, removing purified khellin from solution by recrystallization, mixing the mother liquor from the crystallization step with water, cooling the mixture, and separating crystals of visnagin from the aqueous phase.

11. A process for the recovery of purified khellin and visnagin from an impure mixture thereof which comprises dissolving the impure mixture in n-butylcarbinol, removing purified khellin from solution by crystallization, mixing the mother liquor from the crystallization step with water, cooling the mixture, and separating crystals of visnagin from the aqueous phase.

THOMAS CARL ASCHNER.
JOHN VERGA MEYER.

No references cited.